July 12, 1927.

J. M. FELL 1,635,209

TELEGRAPH DISTORTION MEASURING SYSTEM

Filed Aug. 8, 1925

INVENTOR
J. M. Fell
BY
ATTORNEY

Patented July 12, 1927.

1,635,209

UNITED STATES PATENT OFFICE.

JOHN M. FELL, OF HACKENSACK, NEW JERSEY, ASSIGNOR TO AMERICAN TELEPHONE AND TELEGRAPH COMPANY, A CORPORATION OF NEW YORK.

TELEGRAPH DISTORTION-MEASURING SYSTEM.

Application filed August 8, 1925. Serial No. 49,113.

This invention relates to means for measuring telegraph distortion and particularly to a device capable of producing a visual indication or record of such distortion.

Various systems have been proposed to measure the magnitude of distortion of telegraph signals. In one system, perfect signals are transmitted over a line and recorded at the receiving station on a moving tape. Each signal impulse is then measured in order to determine distortion of the signals, that is to say, the lengthening or the shortening of the signal due to the characteristics of the circuit over which it has been propagated. Such a method has not proven satisfactory due to the difficulty of moving the tape at a uniform speed which introduces a chance of error in making and recording measurements; and furthermore, it is a laborious task to make accurate measurements of each signal impulse.

This invention resides in a method and means for the determination of distortion of telegraph signals in such manner as to make any variations in the length of such signals readily apparent.

The invention resides broadly in the utilization of a beam of light which is permitted to fall upon a rotating mirror for the duration of the signal to be recorded. The mirror causes the reflected beam to travel across a surface, such as a photographic plate, which may be continuously moved, so that successive signals will appear on the developed plate as parallel lines forming a column. If perfect signals are transmitted, variations from the perfect unit, due to lines or apparatus effects, will be indicated by lengthened or shortened lines in the column.

Figure 1:
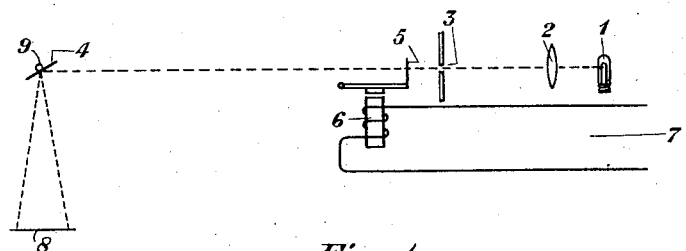
Figure 2:
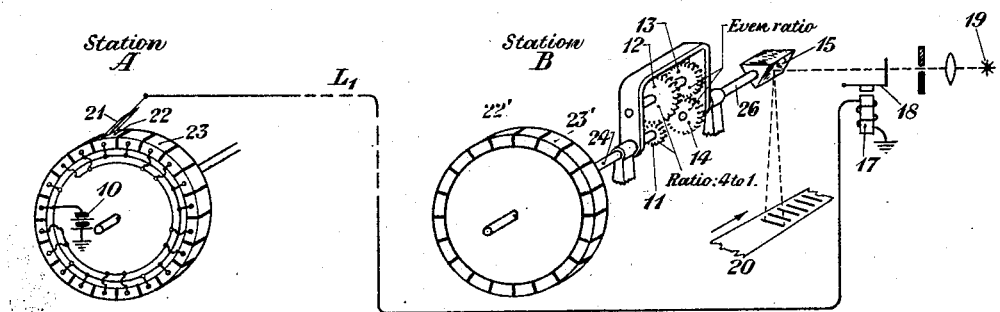
Figure 3:
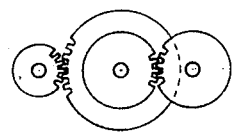
Figure 4:
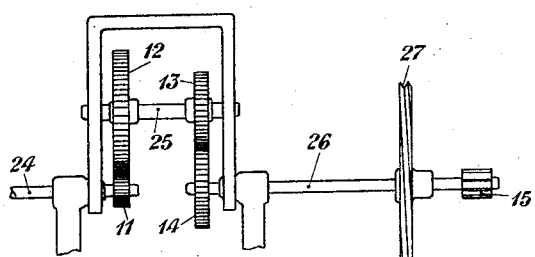

The invention will be clearly understood from the following description when read in connection with the attached drawing, of which Figure 1 shows schematically the principle underlying the invention: Fig. 2 shows the manner in which the scheme illustrated by Fig. 1 may be applied to a circuit for the measurement of distortion; and Figs. 3 and 4 show details of the gearing necessary for carrying out the invention.

In Fig. 1 the rays of light from a source 1 which may be of any character are focussed by a lens 2 to form a beam to pass through the diaphragm 3 and to fall upon a mirror 4 when the shutter 5 has been drawn downwardly, that is, out of the path of the beam by the energization of the relay 6 connected with a source of signals 7. Owing to the motion of the mirror, which is rotated about the axis 9, the beam of light will be caused to travel across a surface 8, tracing thereon a line whose length depends upon the time in which the shutter 5 is held down under the energization of the relay 6.

The signals may be indicated visually or recorded photographically, and successive signals are in such relative position that variations in them are readily apparent. The successive signals may be represented by straight lines produced by a beam of light on a screen or photographic film or plate. By moving the screen slightly at a regular rate while making records successive dot signals appear as a column of horizontal lines. Any imperfect signals will be indicated by a lengthening or shortening of the corresponding lines in the vertical column of horizontal lines.

In tests of signal distortion it is customary to use a distributor as shown in Fig. 2 to transmit perfect signals. A preferred form of distributor has a rotating commutator divided into 20 segments, and, as shown, successive pairs of segments are usually connected in parallel. Alternate pairs are connected with a source of potential and used to produce dot signals. Hence, during each revolution of the commutator five dots of equal length separated by spaces equal in length to the dot signal are transmitted, i. e., there are five dot cycles per revolution.

In the arrangement shown in Fig. 2 the impulses whose distortion is to be measured are transmitted from a distributor at station A at one end of the line $L_1$ to relay 17 of the distortion measuring arrangement at station B at the other end of the line $L_1$. As previously mentioned, certain of the segments of the distributor at station A are connected with a source of potential 10. Whenever the brush 21 passes over a segment such as 22 connected with the said source an impulse will be transmitted over the line $L_1$ to relay 17. This impulse will attract the armature of relay 17 and open the shutter 18 and permit the beam of light from the source 19 to fall upon one of the moving mirrors such as is indicated by 15 and be projected upon the surface 20, which is moving at a definite rate. A mark would thus be produced upon this surface during the continuance of this impulse. At its termination the shutter 18 would be closed by deenergization of the relay 17 and would interrupt the beam of light from the source 19. Each impulse would therefore produce upon the surface 20 a line, the length of which would be determined by the duration of the impulse as received by the distributor at station B.

When used to record signals sent over a telegraph line the mirror at the recording end must operate synchronously with the distributor which transmits the signals at the distant end. Since the distributors are designed to run at a very constant speed, it is desirable to drive the mirror from a distributor to keep it in synchronous operation with the sending distributor.

The shaft 24 of the distributor at station B is connected with a train of gears 11, 12, 13 and 14 shown clearly in detail in Figs. 3 and 4. Gear 11, which is carried by the shaft 24 of the distributor, is connected with the gear 12 which is so proportioned with respect to the gear 11 as to have a speed of rotation equal to one-fourth that of the distributor shaft. Gear 12 is connected by shaft 25 with a gear 13 both of said gears being fixedly connected to the said shaft. Gear 13 meshes a gear 14 of the same size as 13, which is connected with the shaft 26 carrying a plurality of mirrors, such as is indicated by 15.

The manner in which the mirror functions and is controlled is as follows:—

Since the mirror is on a shaft making 1/4 revolution during each revolution of the distributor commutator, it will be in a position to reflect a beam controlled by a particular dot signal transmitted from the distributor at station A to magnet of relay 17 once in four commutator revolutions. During the dot cycle the mirror would rotate 1/20 revolution or through an angle of 18° and during the dot itself (1/2 dot-cycle) the reflected beam would sweep through an angle of 18°. By using 20 mirrors set 18° apart around the shaft rotating at 1/4 the speed of the distributors, one group of five mirrors would reflect successively the beams controlled by the five dots produced during one revolution of the sending distributor, and each mirror would cause the beam striking it to sweep through an angle of 18°, more or less depending on whether the signals were of normal duration. Successive groups of five mirrors would repeat the process during successive revolutions of the distributor. By reducing or increasing the number of mirrors and regulating the speed to properly position each mirror during a dot-cycle, the angle covered by the reflected beam may be increased or reduced. The length of the line traced on the surface 20 would be determined by the beam angle and the distance of the surface from the mirror. A small angle and a considerable distance between the mirror and the recording surface would reduce the tendency to distortion at the ends of the lines due to differences in the angle of incidence to the surface.

Instead of placing a number of mirrors on a revolving shaft a single mirror may be pivoted and caused to move by means of a rotating cam at a uniform rate through a small angle during each dot-cycle, and returned to a normal position between cycles. By this means each dot may be reproduced on the surface 20.

By moving the photographic plate between dots at right angles to the plane of the beam angle, the successive dots would be reproduced as parallel lines. The parallel lines produced by perfect signals would form a perfect column. Imperfect dots would be indicated by lengthened or shortened lines, and the kind and degree of distortion would be readily apparent. The plate may be moved continuously instead of intermittently, in which case the parallel lines would be slightly lower at one end than the other.

One way for controlling the relative movement of the mirror and the recording surface is shown in Fig. 4 wherein the worm gear 27 meshes with the rack 28 which is effectively connected with the surface 20. By such means successive dot signals will be represented by separate lines.

Because of the time lag in the transmission over a line, an adjustment must be made to coordinate the mirror position and the shutter operation. Such an adjustment may be obtained by placing the shaft of the mirror drive in line with the distributor driving shaft and coupling the two by a gear train which may be rotated around the common axial line. A rotation of this gear coupling in the direction of the shaft rotation would bring the mirror to a definite point in its movement at a later time, and vice versa.

Another method of obtaining a record by means of a rotating mirror is to mount the mirror at an angle on the end of a rotating shaft. Such a mirror would cause a reflected beam to trace a circle on a surface perpendicular to the axis of the mirror shaft. By rotating the mirror, say 1/5 turn during a dot signal, an arc of 36° will be traced on the surface for each dot (1/2 dot-cycle). By sensitizing the surface and moving it uniformly, successive signals may be represented by successive curved lines forming a column. The curved lines may be converted to straight lines by means of a spherical and a cylindrical lens. A beam continuously reflected by a rotating mirror sweeps out a cone. A spherical lens placed with the mirror in its principal focus will convert the cone to a cylinder and a cylindrical lens will bring these rays to a straight line at a surface in its principal focus. The length of the line will equal the diameter of the cylinder of rays. The length of a line produced by a dot signal represented by a 36° arc would be equal to the chord of the arc. Since the ends of the line will be slightly contracted, a straight line produced in this way would not be as suitable for comparing telegraph signals as the curved line or the straight line produced by a mirror parallel to the axis of rotation.

Doubtless, mechanical means could be devised for reproducing successive unit signals as parallel lines forming a column, but it is probable that such means would be more complicated than the proposed mirror scheme.

It will, of course, be apparent that the arrangements shown in the drawing are purely schematic and constitute no limitation upon the invention, which is capable of embodiment in other and different forms without departing from the spirit and scope of the appended claims.

What is claimed is:

1. The method of determining the magnitude of the distortion of telegraph signals resulting from transmission of the said signals, which consists in projecting a beam of light upon a recording surface and controlling the duration of the projection of the said beam by and in accordance with telegraph signals.

2. The method of determining the magnitude of the distortion of telegraph signals resulting from transmission of the said signals, which consists in projecting a beam of light upon a recording surface, causing a beam of light to move over said surface at a definite rate and controlling the duration of projection of said beam.

3. The method of determining the magnitude of the distortion of telegraph signals resulting from transmission of the said signals, which consists in producing a beam of light, causing said beam to move across a recording surface at a definite rate, and controlling the duration of the projection of said beam upon said surface by and in accordance with telegraph signals.

4. The method of determining the magnitude of the distortion of telegraph signals resulting from transmission of the said signals, which consists in transmitting the said signals, causing the said signals, as received, to operate a relay adapted to interrupt or not to interrupt a beam of light depending upon whether the received signal impulse is an open or a closed one respectively, and recording the length of time in which the beam is not interrupted.

5. In a system for measuring the distortion of telegraph signals, the combination with a beam of light, of means for reflecting said light, a surface upon which said light is reflected, means to rotate the said reflecting means to cause the beam of light to travel across said surface at a definite rate, a relay having a shutter connected therewith normally obstructing the path of said beam, and a source of telegraph signals connected with said relay adapted to operate said shutter by and in accordance with the telegraph signals.

6. In a system for measuring the distortion of telegraph signals, the combination with a source of light of means for producing a beam therefrom, a mirror rotating in the path of said beam adapted to reflect the said beam, a recording surface upon which the said beam is reflected, an electromagnetically controlled shutter adapted to control the duration of the said beam, and a source of signal impulses adapted to control the said shutter.

In testimony whereof, I have signed my name to this specification this 7th day of August, 1925.

JOHN M. FELL.